(12) United States Patent
Belcher

(10) Patent No.: US 10,099,246 B2
(45) Date of Patent: Oct. 16, 2018

(54) BIODEGRADABLE ENVIRONMENTAL MARKING MATERIAL AND METHOD FOR MARKING AN OUTDOOR ENVIRONMENTAL LOCATION

(71) Applicant: Benjamin Lear Belcher, Bellingham, WA (US)

(72) Inventor: Benjamin Lear Belcher, Bellingham, WA (US)

( * ) Notice: Subject to any disclaimer, the term of this patent is extended or adjusted under 35 U.S.C. 154(b) by 0 days.

(21) Appl. No.: 14/987,562

(22) Filed: Jan. 4, 2016

(65) Prior Publication Data

US 2016/0115323 A1    Apr. 28, 2016

Related U.S. Application Data

(63) Continuation-in-part of application No. 13/207,907, filed on Aug. 11, 2011, now abandoned.

(60) Provisional application No. 61/373,180, filed on Aug. 12, 2010.

(51) Int. Cl.
| | |
|---|---|
| *C09D 5/02* | (2006.01) |
| *B05D 1/02* | (2006.01) |
| *C09D 5/33* | (2006.01) |
| *C09D 5/00* | (2006.01) |

(52) U.S. Cl.
CPC .............. *B05D 1/02* (2013.01); *C09D 5/004* (2013.01); *C09D 5/008* (2013.01)

(58) Field of Classification Search
CPC ........... B05D 1/02; C09D 5/004; C09D 5/008
See application file for complete search history.

(56) References Cited

U.S. PATENT DOCUMENTS

| | | |
|---|---|---|
| 2,174,716 A | 10/1939 | Bethell |
| 4,114,561 A | 9/1978 | Asaro |
| 4,273,264 A | 6/1981 | Legg |
| 5,007,368 A | 4/1991 | Bush |
| 5,028,166 A | 7/1991 | Leishman |
| 5,058,524 A | 10/1991 | Guthrie, Jr. |
| 5,165,966 A | 11/1992 | Adams |
| 5,549,933 A | 8/1996 | Adams et al. |
| 5,735,940 A | 4/1998 | Coller |
| 5,918,565 A | 7/1999 | Casas |
| 5,964,179 A | 10/1999 | Holloway, Jr. |
| 6,863,721 B2 | 3/2005 | Grosskopf et al. |
| 8,261,665 B1 | 9/2012 | Walsh |

(Continued)

*Primary Examiner* — Shuangyi Abu Ali
(74) *Attorney, Agent, or Firm* — Schacht Law Office, Inc.; Dwayne Rogge

(57) ABSTRACT

Disclosed herein is an improved marking material, consisting essentially of food quality colorant (such as food coloring), and a carrier (such as water, or vegetable oil or canola oil). A method for using this material for the marking of environmental locations is also disclosed. In one form the material also comprises a propellant, all contained within a pressurized aerosol canister. The aerosol canister embodiment having a valve assembly connected to an actuator and aperture for selectively releasing the marking material. In another form, a pump-style spray bottle is utilized, and in another form a larger fluid container, pump and spray-wand type dispersal unit such as the devices commonly used in lawn and garden care, or equivalent apparatus may be utilized. In these forms, the material may consist of water-based food coloring and/or oil-based food coloring and vegetable oil depending on whether the application is dry surface or snow.

11 Claims, 1 Drawing Sheet

(56) References Cited

U.S. PATENT DOCUMENTS

| | | |
|---|---|---|
| 2002/0078856 A1 | 6/2002 | Hahn et al. |
| 2004/0241291 A1 | 12/2004 | Liu et al. |
| 2007/0095240 A1 | 5/2007 | Perrone |
| 2008/0166303 A1* | 7/2008 | Tamarkin ............... A61K 8/046 424/43 |

* cited by examiner

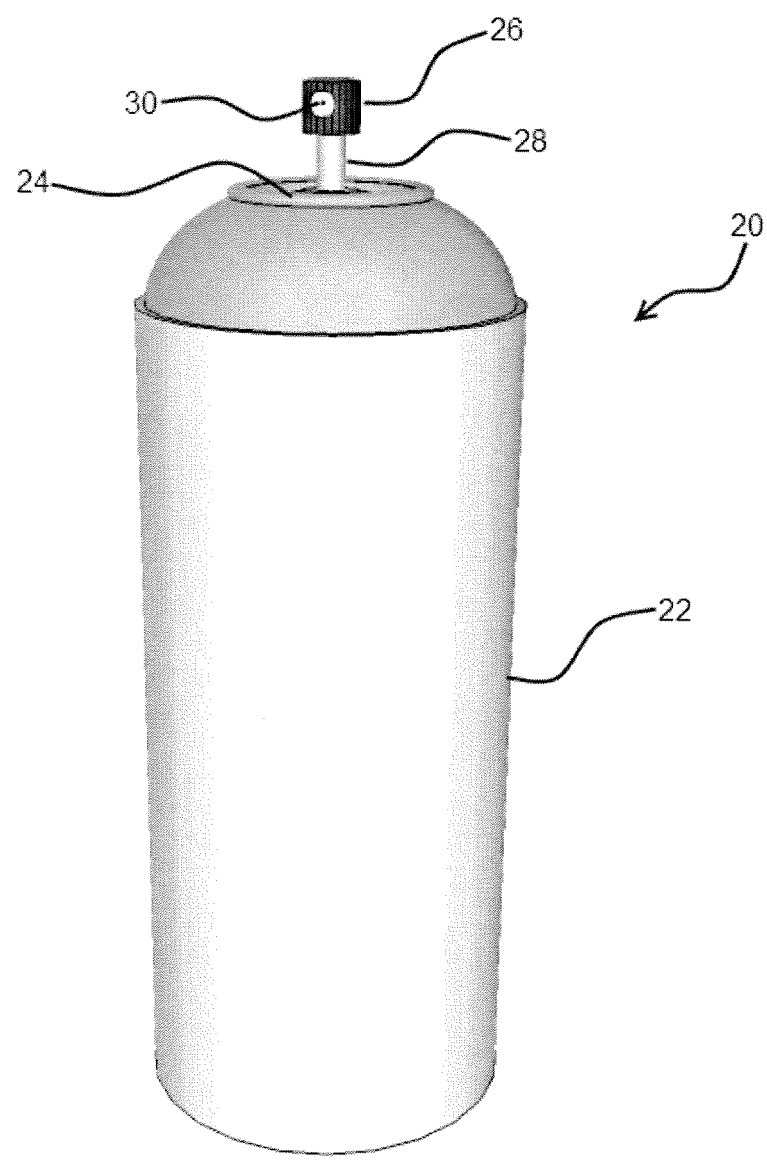

US 10,099,246 B2

BIODEGRADABLE ENVIRONMENTAL MARKING MATERIAL AND METHOD FOR MARKING AN OUTDOOR ENVIRONMENTAL LOCATION

RELATED APPLICATIONS

This application claims priority benefit of and is a Continuation in Part of Ser. No. 13/207,907 filed on Aug. 11, 2011 which in turn claims priority benefit of U.S. Provisional Application Ser. No. 61/373,180, filed Aug. 12, 2010.

BACKGROUND OF THE DISCLOSURE

Field of the Disclosure

This disclosure relates to the field of biodegradable environmental marking materials produced from food-quality materials, a dispersal system, and a method for marking an outdoor environmental location.

SUMMARY OF THE DISCLOSURE

Disclosed herein is an environmental marking material having a total weight by mass. The marking material in one example comprising: vegetable oil comprising 54%-82% of the total weight by mass; propellant comprising 16%-48% of the total weight by mass; at least one food quality colorant comprising 0.12%-9.5% of the total weight by mass, the marking material having an opacity >0.2; and the marking material contained within a pressurized hand held canister having a valve assembly with an actuator and aperture through which the material is selectively released allowing for discriminate marking.

In one example the vegetable oil is canola oil.

In one example the propellant is selected from the list consisting of propane, isobutane, tetrafluoropropene, a combination of propane and isobutane with tetrafluoropropene.

In one example the food quality colorant consists of an oil-based colorant.

Also disclosed is a method for temporarily marking an environmental location by the steps comprising; providing a volume of marking material having a total weight by mass, the marking material in one example consisting of: vegetable oil comprising 54%-82% of the total weight by mass; propellant comprising 16%-48% of the total weight by mass; at least one food quality colorant such as oil based food coloring comprising 0.12%-9.5% of the total weight by mass. In one example, the marking material having an opacity >0.2. In one example the marking material is contained within a hand held canister having a valve assembly with an actuator and aperture through which the material is selectively released allowing for discriminate marking; and identifying the outdoor environmental location to be visually distinguished from the surrounding environment, and selectively dispersing a volume of the marking material on the environmental location.

In one example the vegetable oil comprises canola oil.

In one example the propellant is selected from the list the list consisting of propane, isobutane, tetrafluoropropene and a combination of propane and isobutane and tetrafluoropropene.

In one example, the food quality colorant comprises an oil-based colorant.

Also disclosed is an environmental marking material having a total weight by mass, the marking material comprising: water comprising 49%-77% of the total weight by mass; propellant comprising 21%-53% of the total weight by mass; at least one food quality colorant comprising 0.12%-9.5% of the total weight by mass % of the marking material by volume; wherein the marking material has an opacity >0.2; and the marking material contained within a hand held canister having a valve assembly with an actuator and aperture through which the material is selectively released allowing for discriminate marking.

In one example the propellant is selected from the list consisting of propane, isobutane, tetrafluoropropene and a combination of propane and isobutane and tetrafluoropropene.

In one example the food quality colorant is a water-based colorant.

BRIEF DESCRIPTION OF THE DRAWINGS

FIG. 1 shows a highly schematic view of an aerosol delivery system for the disclosed marking material.

DESCRIPTION OF THE PREFERRED EMBODIMENTS

Disclosed herein is an improved marking material configured for use on environmental surfaces, and a method for using the marking material. In one form, the marking material includes food quality colorant (such as oil-based or water-based food coloring), and a carrier (such as water). In one form the material also comprises a propellant, which when combined with the colorant and carrier may be contained within a pressurized aerosol canister for easy dispersal and marking of an environmental (outdoor) location such as grass, snow, dirt, or equivalents. In another form, the material may consist of food quality colorant (such as an oil-based food colorant), vegetable oil (such as canola oil) and a propellant.

Such an outdoor environmental marking composition in one form includes: vegetable oil comprising 54%-82% of the total weight by mass; propellant comprising 16%-48% of the total weight by mass; at least one food quality colorant comprising 0.12%-9.5% of the total weight by mass.

In a narrower range, the food quality colorant is provided between 0.18% and 3.3% of the total weight by mass.

In one example, the marking composition is contained within a hand-held pressurized canister having a valve assembly with an actuator and aperture through which the material is selectively released allowing for discriminate marking of an outdoor environmental location.

The color of the colorant used may impact the mass percentage of the colorant used. For example, the relative quantity of yellow colorant needed to visually mark an environmental location to a desired opacity and duration of visibility may be 1-2% higher or more than the relative mass of blue colorant for example needed to visually distinguish the same environmental location to an effective opacity level with a density/opacity/duration of visibility that allows a viewer to easily identify the marked location as having been marked for a desired length of time.

In another form, the composition consists of food quality colorant (such as water based food colorant), water, and a propellant pressurized within an aerosol canister. The aerosol canister having a valve assembly connected to an actuator and aperture for selectively releasing the marking material. In another form, a pump-style spray bottle is utilized, and in another non-pressurized form a fluid container, pump and spray-wand type dispersal unit such as the devices commonly used in lawn and garden care, or equivalent apparatus may be utilized. In these forms, the material may consist of water-based food coloring and/or oil-based food coloring and vegetable oil depending on whether the application is dry surface or snow.

The idea for this composition and method for use was inspired in 1996 when the applicant observed a skier use standard spray paint to mark a snow ski jump at a ski resort, considered the resulting chemical pollutants that would enter storm water runoff, and discovered that a more environmentally friendly product should exist for the purpose of marking (painting) snow and similar outdoor environmental locations as no such product was available at the time. The desired outcome was to produce a marking material that will temporarily paint snow with a marking that is visually discernable on snow and other outdoor surfaces without polluting snow/storm water with non-biodegradable chemicals. Product development began soon thereafter and the end result is the disclosed composition and method for marking snow or other environmental surfaces.

Natural and biodegradable ingredients were trialed and tested as snow paint. Testing began by blending various natural ingredients (carrots, beets, grass, blueberries, etc.) with water or vegetable oil, using the various mixtures to mark snow with a spray wand containing a liquid marking material in a container and observing and comparing the marking color density, opacity, visibility, and duration of each of the trialed formulas. Food coloring when combined with the other materials disclosed herein was discovered to be an efficient and effective ingredient for use in marking snow and other environmental outdoor locations in a safe and environmentally friendly manner. It was observed during these early tests that oil based ingredients such a vegetable oil and oil based food coloring provide a more visually distinguishable paint than previously tested materials and resulted in a longer marking duration on snow than water based ingredients due to migration of water based ingredients. As the vegetable oil and oil based food coloring and water do not mix, testing showed that the oil based colorant vividly stands out on snow longer than water based ingredients.

Aerosol sprays containing products and propellants were attractive to the applicants' intended market due to the convenience for the end user of omitting the need to carry a larger fluid container with a pump and spray-wand type dispersal unit.

With propellants such as tetrafluoropropene (Honeywell Solstice propellant), the disclosed composition and method of marking contain ingredients that make this composition the most environmentally friendly aerosol spray paint intended for temporary marking applications available on the market to the knowledge of the applicant. Although this composition and method for marking was designed for use on snow, it also functions efficiently as a temporary marker on a number of other outdoor environmental surfaces.

Since conception this composition and method for marking has been successfully tested by ski areas for marking ski race courses, features in snow parks and hazards on ski runs. It has also been used for a variety of other applications as a temporary marker such as denoting where to dig in utility marking, marking trees in forest service projects, in development projects, in outdoor scientific studies near rivers, in landscaping/gardening, in lab tests for marking plants, in bike and running race courses, in art projects and also in a number of other applications.

It is well known in outdoor marking and painting that non-permanent marking is frequently sufficient in many applications. In the practice of surveying, temporarily denoting locations is standard practice while working on surveying projects. In the practice of engineering and construction, the marking material can be used to temporarily mark where to dig in order to lay utilities such as natural gas, water, sewer, etc. In landscaping, when marking where to weed or cut grass, temporary marking also suffices. Also in particular instances in mining, farming, excavation, logging, and other fields, temporary paint markings are sufficient for the needs of the users.

At present it is common to use less environmentally friendly marking materials in these previously mentioned applications such as standard aerosol spray paints which frequently contain toxic chemicals. It is desirable for humans, pets, wildlife and the environment to use less harmful marking materials in these instances.

It is well-known in the art of marathon organizers, cross country runners, hikers, and other outdoor enthusiasts that it is often desired to temporarily mark certain trails, dirt, grass and other environmental surfaces to direct outdoor enthusiasts in a desired path, such as in a race or alternatively as a warning of hazardous obstacles to other outdoor enthusiasts. In the current state of the art, standard spray paints are commonly used for this purpose.

In the art of ski race course and ski area snow-park marking it is often required to visually mark and distinguish the race course or snow park features. The standard composition used for large surface area marking in these applications is a mixture of water, dye and anti-freeze. Anti-freeze is included in the mixture for the purpose of preventing the snow from freezing to a hard solid when the water-based mixture, which is above freezing temperature, is applied to snow. The resulting storm water runoff contains anti-freeze which includes chemicals (such as Ethylene glycol) that are toxic to animals and humans either in any quantity or if consumed in large enough quantities depending on the type of anti-freeze used. In smaller surface area ski resort snow marking applications, standard spray paints are occasionally used as well.

One of the major drawbacks of these currently existing marking methods (such standard spray paint or mixtures including anti-freeze) for the outdoor applications is their non-biodegradable nature, such that at the end of the desired use, the paint elements remain in the environment and it is not practical to remove them. Thus, nature is coated with materials containing toxic chemicals which also leave a relatively permanent coloring agent in the environment. Additionally, animals may be attracted to and ingest the colorized environmental surfaces, potentially causing sickness or death. One of the major advantages of the disclosed marking material is that the product that is applied to environmental surfaces consists of biodegradable, food quality ingredients that are not harmful to animals or the environment.

U.S. Pat. No. 5,165,966, incorporated herein by reference, provides a general description of the general purpose of such snow marking materials. The disclosure presented in this patent, however, suffers from several detriments, including that once the water and gelatin admix with the food-coloring additive, the composition will gel once cooled either in the dispersal unit or once sprayed. Additionally, as this composition is an aqueous solution, the coloring agents will tend to disperse in the snow or on other environments as the snow melts. The snow will tend to melt as a result of the color change resulting by the adjusted absorption rate of the colorized snow in combination with solar energy.

U.S. Pat. No. 5,735,940 also utilizes an aqueous solution that further incorporates water soluble salts. In addition to the detriments described above relative to the '966 patent, this patent suffers from the detriment that often such salts are harmful to plant life. Additionally, anti-freezes, surfactants, emulsifiers, etc. may also be incorporated, which are often detrimental not only to plant life but also to animal life.

Common edible release agents such as vegetable oil based aerosol cooking sprays such as for example the cookware release spray disclosed in U.S. patent application Ser. No. 10/447,078 may contain vegetable oil and a propellant; however, testing of an equivalent cookware release spray has shown that marks left on snow or other environmental surfaces by such cookware release sprays is not substantially visually distinguishable from the surrounding non-marked environmental location and does not suffice for use as an identifiable material intended for marking.

In one test conducted on clean, white snow, common household cookware release sprays did not leave a mark that was visually distinguishable from natural markings left by animals. A chart showing these test results is provided below and shows both the marking density (in a standard scale where 0 is white and 1 is black) and the duration of time the relative material was visible to the naked eye.

| Material | Disclosed marking material | Cookware release spray equivalent to 10/447,078 |
|---|---|---|
| Color | Federal standard color 15056 | Color is most similar to federal standard color 23793 |
| Marking density - opacity | 0.83 | 0.17 |
| Duration of visibility (50° F., no precipitation, no UV): | over 48 hours | less than 4 minutes |

A marking density of above 0.2 provides adequate visual distinction. In a narrower range, a marking density of greater than 0.35 provides excellent visual distinction.

In addition, in testing the markings left by common cookware release sprays had a marking opacity far insufficient for the purpose of marking an environmental outdoor location that was visually perceptible to a user. Testing also showed that cookware release sprays are not effective for use as a marking material and are difficult to identify relative to the claimed temporary marking paint invention.

Looking to FIG. 1, a highly schematic view of one embodiment of a dispersal unit comprising a snow-marking aerosol 20 is shown comprising a pressurized aerosol canister 22, having at one end a valve assembly 24, which holds the pressurized material therein until an actuator 26 is engaged. The actuator 26 is coupled to the valve assembly 24 by way of a stem 28. The actuator 26 may also comprise and aperture 30 through which the marking material is dispersed. As is well known in the art, the aperture 30 may or may not be a component of the actuator 26.

By utilizing a very simple food quality combination of components in one form within a pressurized aerosol canister 22, an environmental marking material can be provided easily to practitioners without the above environmental detriments and with the additional ease of use common to aerosols. Additionally, by using a hydrophobic oil or its equivalent, the colorant will remain suspended and localized within the oil element and will not be absorbed and diluted by the surrounding snow.

In other embodiments, a pump-action style spray bottle, larger pump and spray type dispersal units commonly used in lawn and garden care, or equivalent apparatus may be utilized. These dispersal units will most commonly be used with water and food colorant, or oil and food colorant depending on whether the material will be applied to a dry or a wet surface.

While the present invention is illustrated by description of several embodiments and while the illustrative embodiments are described in detail, it is not the intention of the applicant to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An environmental marking material having a total weight by mass, the marking material consistinq of:
    vegetable oil comprising 54%-82% of the total weight by mass;
    propellant comprising 16%-48% of the total weight by mass;
    at least one food quality colorant comprising 0.12%-9.5% of the total weight by mass,
    the marking material having an opacity >0.2; and
    the marking material contained within a canister having a valve assembly with an actuator and aperture through which the material is selectively released allowing for discriminate marking of an environmental location.

2. The environmental marking material as recited in claim 1 wherein the vegetable oil is canola oil.

3. The environmental marking material as recited in claim 1 wherein the propellant is selected from the list consisting of propane, isobutane, tetrafluoropropene, and a combination of propane and isobutane with tetrafluoropropene.

4. The environmental marking material as recited in claim 1 wherein the food quality colorant consists of an oil-based colorant.

5. A method for temporarily marking an environmental location by the steps comprising;
    providing a volume of marking material as recited in claim 1;
    identifying the outdoor environmental location to be visually distinguished from a surrounding environment; and
    selectively dispersing a volume of the marking material on the environmental location.

6. The method as recited in claim 5 wherein the vegetable oil comprises canola oil.

7. The method as recited in claim 5 wherein the propellant is selected from the list the list consisting of propane, isobutane, tetrafluoropropene and a combination of propane and isobutane and tetrafluoropropene.

8. The method as recited in claim 5 wherein the food quality colorant comprises an oil-based colorant.

9. The environmental marking material as recited in claim 1 wherein the canister is pressurized.

10. The environmental marking material as recited in claim 1 wherein the canister is hand held.

11. The environmental marking material as recited in claim 1 comprising a duration of visibility of over 48 hours.

* * * * *